R. L. POTTINGER, M. B. FLYNN AND B. F. PRICE.
HOISTING AND TRANSPORTING APPARATUS.
APPLICATION FILED JAN. 20, 1919.

1,367,987.

Patented Feb. 8, 1921.

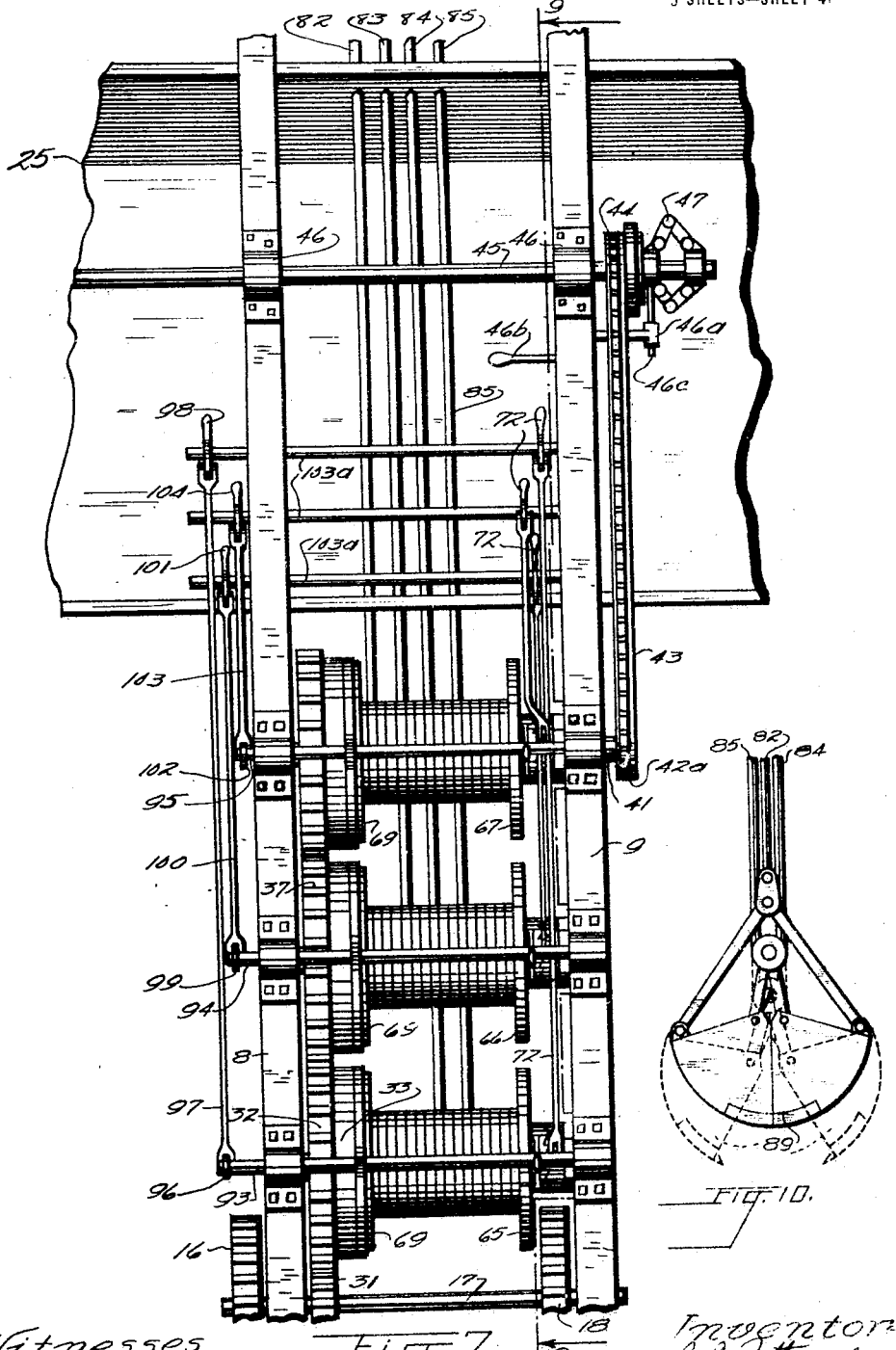

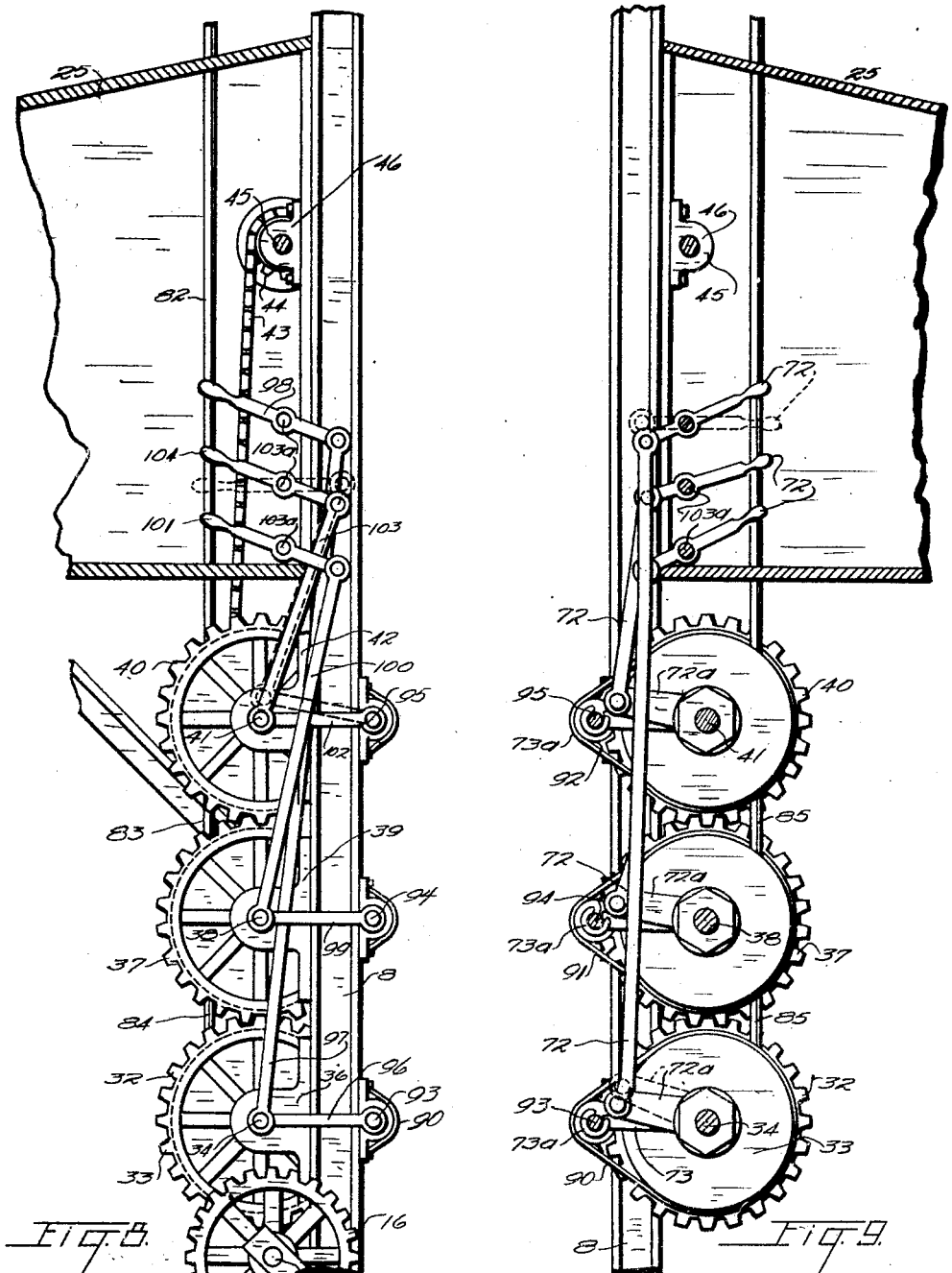

UNITED STATES PATENT OFFICE.

ROBERT L. POTTINGER, MORTIMER B. FLYNN, AND BENJAMIN F. PRICE, OF CHICAGO, ILLINOIS.

HOISTING AND TRANSPORTING APPARATUS.

1,367,987. Specification of Letters Patent. Patented Feb. 8, 1921.

Application filed January 20, 1919. Serial No. 272,058.

*To all whom it may concern:*

Be it known that we, ROBERT L. POTTINGER, MORTIMER B. FLYNN, and BENJAMIN F. PRICE, citizens of the United States, residing at Chicago, in the county of Cook and State of Illinois, have jointly invented certain new and useful Improvements in Hoisting and Transporting Apparatus, of which the following is a specification.

This invention relates to hoisting and transporting apparatus and more particularly to such apparatus adapted primarily for loading and unloading railroad cars although the apparatus, obviously, may be employed for other purposes. One object is to provide apparatus of this type in which the hoisting mechanism and the transporting mechanism are operated and controlled from one and the same motor or power source which power source is at all times under the control of one operator or engineer only. A further object is to provide apparatus of this type equipped with rotary drums so arranged that when the load is raised all power can be disconnected and the brakes freed and the load will remain suspended from its supports and stationary at whatever elevation it has attained.

With the foregoing and other objects in view the invention consists in the combination and arrangement of parts to be hereinafter fully described, pointed out in the appended claims and illustrated in the accompanying drawings which form a part of this specification and in which—

Figure 1:
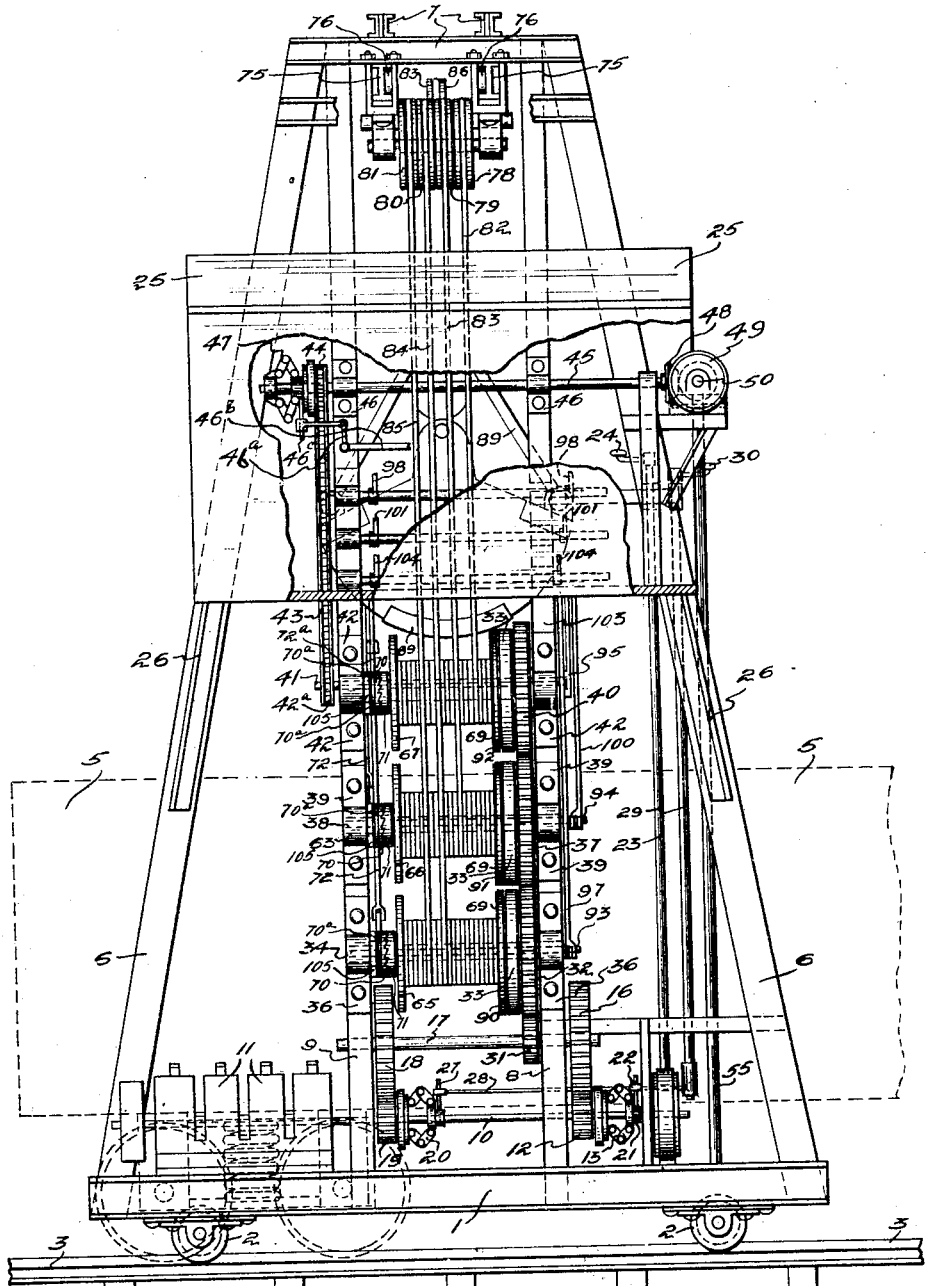
Figure 1 is a side view of the complete machine illustrating its application.
Figure 2:
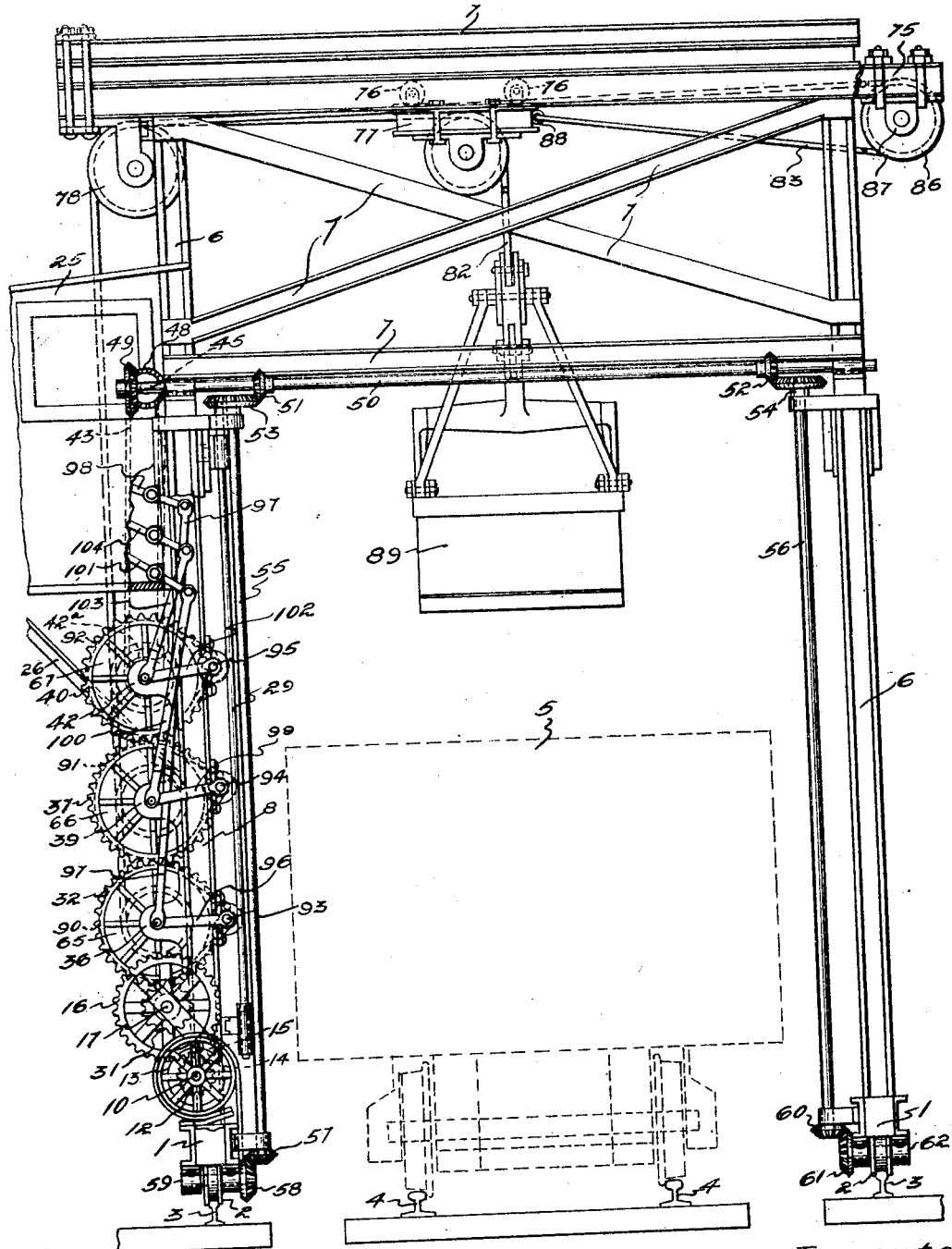
Fig. 2 is an end view of Fig. 1.
Figure 3:
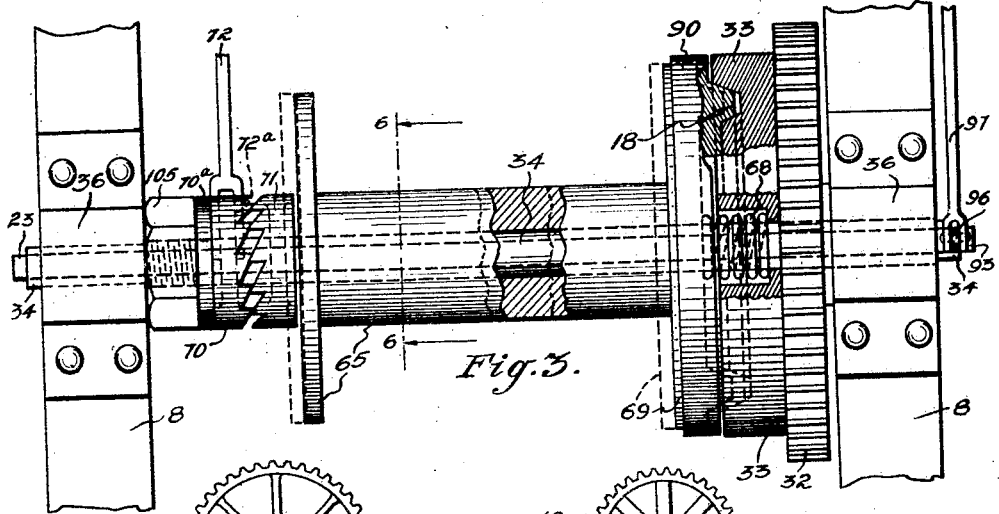
Fig. 3 is an enlarged fragmentary sectional view of one of the rotary drums employed.

Fig. 7 is a fragmentary view of the machine. Fig. 8 is a side view of Fig. 7. Fig. 9 is a section on line 9—9 of Fig. 7. Fig. 10 is a detail view of the shovel and connections.

Like reference characters denote corresponding parts throughout the several views.

The machine comprises a frame the base beams 1 of which are supported upon wheels 2 adapted to travel over rails 3 which rails are laid beside the railway tracks 4 preferably in a coal yard. The rails 3 are spaced away from the track 4 a distance sufficient to permit freight or coal cars 5 to pass therebetween without interference with the frame erected and supported upon the beams 1 which frame will now be described. The frame comprises the corner beams 6 which are connected by suitable brace beams 7. Supported by one base beam 1 and certain brace beams 7 upon one side of the frame between two of the corner beams are a pair of uprights 8, 9 in which is journaled the engine shaft 10 directly driven by the engine 11 arranged upon one beam 1. Running loose upon the shaft 10 is a pinion 12 that is adapted for releasable engagement with clutch 13 that is fast upon said shaft 10, said pinion being constantly in mesh with an idler 14 carried upon a pin shaft 15 journaled in bearings carried by the frame, said idler meshing also with a spur gear 16 fast upon a transmission shaft 17 journaled in the uprights 8, 9, said shaft 17 having secured thereto, also, the spur gear 18 that is constantly in mesh with a pinion 19 loose upon shaft 10, said pinion being adapted for releasable engagement with the clutch 20 fixed upon the said shaft 10.

Figure 5:
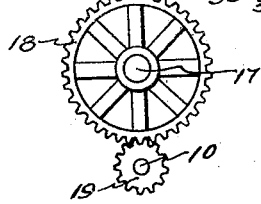
Fig. 5 is a side view of a pair of gears employed, enlarged.
Figure 4:
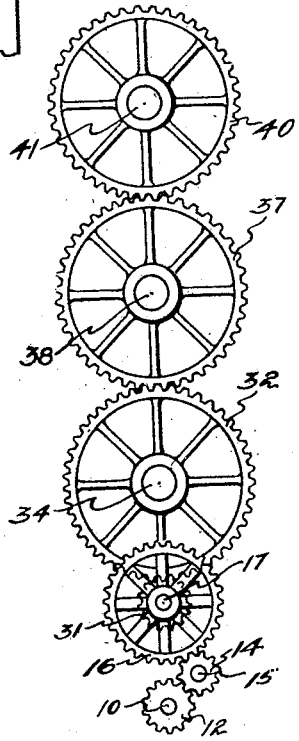
Fig. 4 is a side view, enlarged, of a chain of gears employed.
Figure 6:
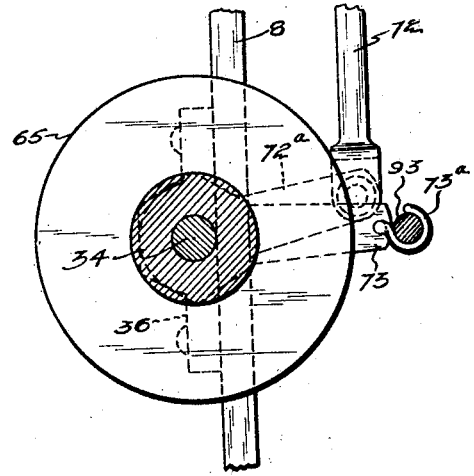
Fig. 6 is a cross section taken on line 6—6 of Fig. 3.

The method of moving the machine back and forth upon the rails 3 will now be set forth. The said clutch 13 is connected by bar 21 and pitman 22 with a vertically disposed rotary shaft 23 which is provided with and controlled by means of a hand lever 24 in easy reach of the operator stationed in the tower house 25 which is carried by the frame and secured by supports 26 to the corner beams 6. The said clutch 20 is connected by bar 27 and pitman 28 to the vertically disposed rotary shaft 29 provided with and controlled by the hand lever 30 also within easy reach of the operator. By reference to the gearing described and shown clearly in Figs. 4 and 5 it is obvious that rotation of shaft 17 in either direction may be had by driving said shaft either by pinion 12 or 19 as desired, the drive through pinion 19 driving shaft 17 in a reverse direction to that imparted by pinion 12. Fast upon the said transmission shaft 17 is a pinion 31 in mesh with a clutch gear 32 which is bolted or otherwise made fast to a clutch section 33 which is fast to drum shaft 34 arranged in bearings 36 secured to the uprights 8, 9. The clutch gear 32 is in mesh with another clutch gear 37 fast upon another drum shaft 38 arranged in bearings 39 carried by the uprights 8, 9; and the clutch 37 is also in mesh with a third clutch gear 40 fast upon a third drum shaft 41 disposed in bearings 42 carried by the uprights 8, 9. The said drum shaft 41 is projected to carry the sprocket 42ª which is connected by sprocket chain 43 to another sprocket 44 loose upon a transverse shaft 45, journaled in bearings 46 carried by uprights 8, 9, said sprocket 44 being adapted through the medium of a bell crank 46ª and connections 46ᵇ, 46ᶜ for engagement by a clutch 47 whereby said pinion may be secured to said shaft to rotate the same. The said shaft 45 is connected by bevel gears 48, 49 with another shaft 50 journaled in bearings carried by the corner beams 6, said shaft 50 being provided with bevel gears 51, 52 in mesh, respectively, with the bevel gears 53, 54 of the vertical shafts 55, 56, the shaft 55 being connected by bevel gears 57, 58 to the driving axle 59 of one wheel 2 and the shaft 56 being connected by bevel gears 60, 61 to the driving axle 62 of another shaft 2. The connections just described serve, then, to operatively connect the driving axles 59, 62 of two wheels 2 to the engine shaft 10, and the control levers 24, 30 may be employed to drive the train of connections in either of two directions.

The drum shafts 34, 38, 41 aforesaid are provided, respectively, with the drums 65, 66, 67 which run loose and as the construction of the three drums is identical it will suffice to describe one. Each drum shaft has a clutch gear previously described, fast thereto, and each clutch gear is secured to a clutch section 33 and each clutch section is provided with a separation spring 68 whereby a detachable or releasable coöperating clutch section 69 is normally retained in disengaged relation with its coöperating section 33. The drums and their attached clutch sections are adapted to be moved longitudinally of their shafts to cause their clutch sections to engage operatively with the clutch sections 33 by means of a sectional thrust-sleeve 70, 71 loose upon the drum shaft and a collar 70ª fast upon the said shaft. The sections of the sleeve 70, 71 are provided with teeth adapted to mesh. The section 70 is provided with an integral link 72ª that is engaged by a connecting rod 72 that has a hand lever termination in easy reach of the operator and the section 71 is provided with a link 73 connected by hook 73ª to a brake shaft 93 to be hereinafter described. The hook 73ª and brake shaft hold the thrust-sleeve section 71 against possible rotation with the drum shaft and when the section 70 is turned by means of its link 72ª and connections it bears against the collar 70ª and its teeth ride upon the teeth of the section 71 thus causing longitudinal movement of the same together with the drum longitudinally of the drum shaft thus operatively engaging the clutch sections 69, 33 and rotating the drum. Upon the top of the frame, I provide tracks 75 which may project beyond one end of the frame and upon said tracks the wheels 76 of a trolley 77 run. Sheaves 78, 79, 80, 81 are carried at one end of the frame and cables 82, 83, 84, 85 run thereover and to said trolley which trolley carries a pulley provided with sheaves. The cable 83 aforesaid is wound upon the drum 66 and passes over sheave 79 and above the trolley 77 and about a sheave 86 carried by a pulley 87 secured to the extended end of the track 75, said cable then being secured to an eye-bolt 88 at one end of the trolley 77. To move the trolley along its track the drum 66 is moved longitudinally of its shaft, in a manner previously described, to cause the clutch sections 69, 33 to engage and the drum to rotate thus causing the cable 83 to be wound thereupon and moving the trolley toward the pulley 87. When the trolley is to be returned to normal position or moved away from pulley 87 the drum 66 is allowed to run loose and the weight of the shovel 89 will then move the trolley in the desired direction until the said drum through the operation of its brakes, to be hereinafter described, is locked against rotation.

The cables 82, 84, 85 are all secured to a sectional bucket 89 of any standard construction, two of said cables serving to support said bucket. The bucket is of that type in which the coöperating sections spread or open at the bottom and are normally retained in open position through gravity. The cable 82 passes from the bucket over one of the sheaves of the trolley, over sheave 78 to drum 67 and is wound thereupon, and the cables 84, 85 pass from the bucket over sheaves of the trolley and over the sheaves 80, 81 to drum 65 and are wound thereupon. Any drum 65, 66 or 67 is driven as previously described, its clutch sections 69, 33 being caused to mesh. Rotation of drum 67 in one direction to wind cable 82 thereupon will cause this cable to bring the bucket sections together, in a well known manner, closing the bucket. The bucket in open position is lowered into the car or pile of coal and the sections closed by drum 67 and cable 82 thus loading the bucket. The drum 65 when rotated winds the cables 84, 85 upon itself and so raises the bucket. The bucket is lowered through gravity when drums 65, 67 are permitted to run loose, the cables 84, 85 and 82 being unwound by this bucket movement. In raising the bucket the drum 67 is preferably rotated with the drum 65 to avoid slack in the cable 82.

At any time the power is completely shut off and the brakes all freed the shovel, either filled or empty, will remain stationary at any elevation it has attained provided the drums are not running free upon their shafts. This is due to the fact that cable 82 runs from the shovel to drum 67 and cables 84, 85 run from the shovel to drum 65 and so the weight of the shovel is divided between those drums and their rotation is prevented by the gear 37 which is in mesh with the gears 32, 40 and effectually prevents independent rotation of either of the last named gears. The weight of the shovel 89, full or empty, exerts a constant pull upon the drums 65 and 67 through the medium of the cables 84, 85 which both run to drum 65 and cable 82 which runs to drum 67. With all drums made fast to their shafts, however, through engagement of their clutch sections 69, 33 the weight of the shovel cannot rotate the drums 65, 67, which drums rotate in the same direction because the drum 66 rotates in a reverse direction and is connected by cable 83 to the trolley 77. With the drums 65, 67 unwinding their cables the drum 66 would be winding its cable 83 upon itself which would move the trolley 77 away from the drums which operation manifestly is impossible while the shovel descends and hence the mechanism is locked. All of the drums 65, 66, 67 cannot rotate simultaneously when locked in engagement with their shafts. When loose upon their shafts they may so rotate. With the brakes off and the power off the shovel is automatically locked in any adjusted position provided the drums are in engagement with their clutch gears and clutch sections 33. This engagement is had when the rods 72 are used to cause engagement of the clutch sections 69, 33. From the foregoing it is obvious that the shovel is automatically held stationary at any elevation desired by merely disconnecting the power and freeing the brakes.

Each drum is provided with brake mechanism. These drums are provided upon their respective clutch sections with brake bands 90, 91, 92 which are operatively engaged by the brake shafts 93, 94, 95 all arranged in bearings secured to the uprights 8, 9. The brake shafts 93 is connected by link 96 to connecting rod 97 which is connected to a hand lever 98 located in easy reach of the operator. The brake shaft 94 is connected by link 99 with connecting rod 100 which is connected to hand lever 101 in easy reach of the operator. The brake shaft 95 is connected by link 102 to connecting rod 103 that is connected to hand lever 104 in easy reach of the operator. The several hand levers being fulcrumed upon the cross shafts 103$^a$ carried by the uprights 8, 9. When any individual drum has been operated and its rotation stopped by releasing its clutch section 69 from its section 33, this release being effected through the medium of the spring 68, the drum is locked against further rotation upon its shaft by throwing its brake band into engagement with its clutch section 69 in the manner previously described. By means of trolley 77 and connections the shovel may be moved clear of the frame and over a coal truck located beside the railroad track to load the same with coal. This operation is accomplished by drawing the trolley, as previously described, approximately to the pulley 87. An adjusting nut 105 is arranged upon each drum shaft to move the same longitudinally to take up wear between the clutch sections when necessary.

What is claimed is:—

1. A hoisting and transporting apparatus comprising in combination, a wheeled frame, a parallel series of spaced, freely rotatable, similar shafts journaled in the frame, a drum carried on each of said shafts and adapted for rotation and longitudinal movement thereon, a gear wheel rigidly mounted on one end of each shaft, said wheels being meshed in successive relation, a power source in connection with said gear wheels, component clutch members carried by the adjacent faces of each of said drums and gear wheels, drum actuating levers in the frame and connected to said drums for longitudinal movement thereof on their respective shafts for engagement of said clutch members and consequent rotation of the drums, brakes on each of said drums, and levers in the frame for operation of said brakes, a trolley disposed in the frame, a sectional shovel depending therefrom, a cable connected to one of said drums and to the trolley, a cable connected to another of said drums and to the shovel sections, cables connected to another of said drums and to the shovel for support thereof, frame propulsion gearing in connection with the gear wheels on said shafts, and means for operating said propulsion gearing through the first named gear wheels independently of the drums and cable mechanism.

2. In an apparatus of the character described a mobile frame, hoist mechanism in said frame comprising coacting geared drums, a shovel, and cable connection between said drums and shovel for raising, lowering and laterally moving said shovel, frame propulsion gearing disposed in the frame, a power source carried in the frame and common to said hoist mechanism and frame propulsion gearing, and connection between said frame propulsion mechanism and hoist mechainsm whereby all movement of said mechanisms will be automatically arrested upon cessation of the power from said power source.

In testimony that we claim the foregoing as our own we have hereto affixed our signatures in the presence of two subscribing witnesses.

ROBERT L. POTTINGER,
MORTIMER B. FLYNN,
BENJAMIN F. PRICE.

Witnesses:
H. A. McCLARY,
G. L. WARNER.